United States Patent Office 3,436,066
Patented Apr. 1, 1969

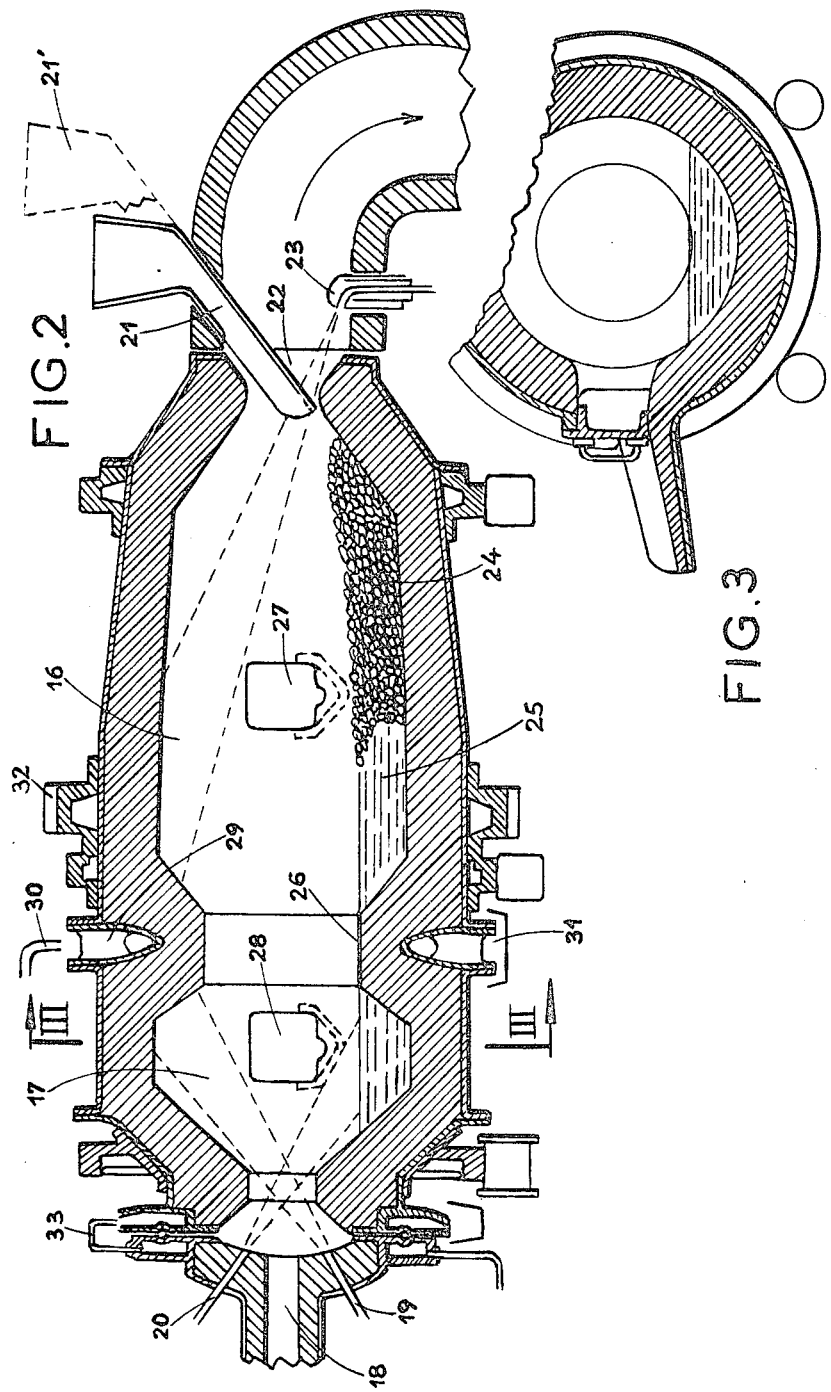

3,436,066
ROTARY FURNACE ENABLING MELT TO BE OBTAINED CONTINUOUSLY FROM LIQUID STEEL OR IRON
Jean Bouchet, Clery-Saint-Andre, Loiret, France, assignor to Societe Metallurgique d'Imphy, Paris, France, a company of France
Filed May 2, 1966, Ser. No. 546,780
Claims priority, application France, May 7, 1965, 16,260
Int. Cl. C21c 5/38; C21b 13/08; F27b 7/36
U.S. Cl. 266—18                                          4 Claims

ABSTRACT OF THE DISCLOSURE

A rotary furnace producing a continuous melt for liquid steel or iron has a burner at one end and a chute for feding ore at the other end. Two jets of pure industrial oxygen discharge adjacent the burner, one directed upwardly to direct the burner gases toward the upper part of the furnace and the other directed toward the surface of the bath. A third jet of pure industrial oxygen is located at the other end of the furnace and is directed toward the interior and toward the top of the furnace.

---

The invention relates to a rotary furnace enabling melt to be obtained continuously from liquid steel or iron.

The furnace according to the invention is of the type that rotates or rolls about a horizontal or substantially horizontal axis and is heated by a flame from one end, the smoke issuing from the opposite end.

Such a furnace can be fed directly with iron ore, or with ore that has previously been partially reduced to the solid state; in the latter the raw material, for example in a spongy form, is a mixture of wüstite and metallic iron, together with small quantities of magnetite. The relative proportions of wüstite and metallic iron may vary considerably and the total iron content may vary from traces to 98% in the metallic form, the reminder comprising an oxide which may be represented by the formula $FeO^x$, in which $x$ is approximately unity.

$FeO^x$ is reduced with carbon, the reduction beginning at a low temperature, i.e. about 500° C. It is very rapid from 900 to 1150° C., and it slows down when the fusion of the metallic iron begins.

It is often advantageous to obtain molten metal with a dissolved carbon content greater than 2%. In this case the liquefaction of the iron begins between 1150 and 1160° C. and the metal separates progressively and readily from the gangue. At 1300° C. separation is practically complete.

For an economic process it is desirable for no more free carbon to remain at a temperature of about 1300° C. The quantity of carbon dissolved in the metal may then be, for example, between 2 and 4.5% of the weight of the metal.

If the heating of the metal bath then continues, the latter boils while liberating carbon monoxide; as a result, the carbon content falls at the same time that the temperature rises, up to 1650° C., for example, if it is desired to obtain very mild steel.

The obtaining of metal in discontinuous operation, i.e. by the treatment of separate charges of partly reduced or unreduced ore, the metal being liquefied and refined to a given carbon content, is easily effected in a furnace with a horizontal axis, rolling or rotating about the said axis and heated by one end. The temperature of the furnace rises progressively from the charging temperature until it reaches the temperature necessary for the refining and tapping of the final metal bath.

It is more difficult to obtain the metal if continuous operation is desired, i.e. with charges introduced uninterruptedly during the reducing operation. The charges have to be fed through one end of the furnace and tapping must be carried out at another part of the furnace, continuously or at regular intervals succeeding one another with great rapidity.

Obtaining melt by continuous operation does not involve insuperable difficulties, for charging can be stopped or slowed down for a few minutes during which the temperature of the furnace reaches 1260° or rises above that temperature to 1300° C. The melt obtained is then tapped and the oxide to be reduced is introduced into the furnace so as to cool the latter to a temperature of about 1200° C. The operation is then continued. This procedure is not very disadvantageous, for the difference in temperature between the normal functioning conditions of the furnace and the tapping of the metal is slight. Much more serious disadvantages are encountered, however, when it is desired to obtain a decarburised metal whose tapping temperature must be as much as 1600° C. There is then a more considerable difference in temperature between the normal operation of the furnace and the tapping operation. The charge must remain below a temperature of 1150° C. and the times sufficient for its reduction may be raised progressively to 1600° C., the tapping temperature.

The invention relates to a furnace for obtaining by continuous operation melts of steel or liquid iron without any disadvantage due to the temperature difference referred to above.

According to the invention, the furnace has, on the side on which the smoke issues, a chute for feeding the oxide to be reduced and an internal casing providing a chamber in the general form of a truncated cone coaxial with the furnace, the smaller end of which chamber is on the side of the charging chute.

The invention will now be described in greater detail with reference to embodiments given by way of example and shown in the drawings.

FIGURE 2 is a vertical section of a modification of a furnace according to the invention which may be used in particular to obtain steel or pure iron, and FIGURE 3 is a section along III—III as seen from the left in FIGURE 2.

Figure 1:
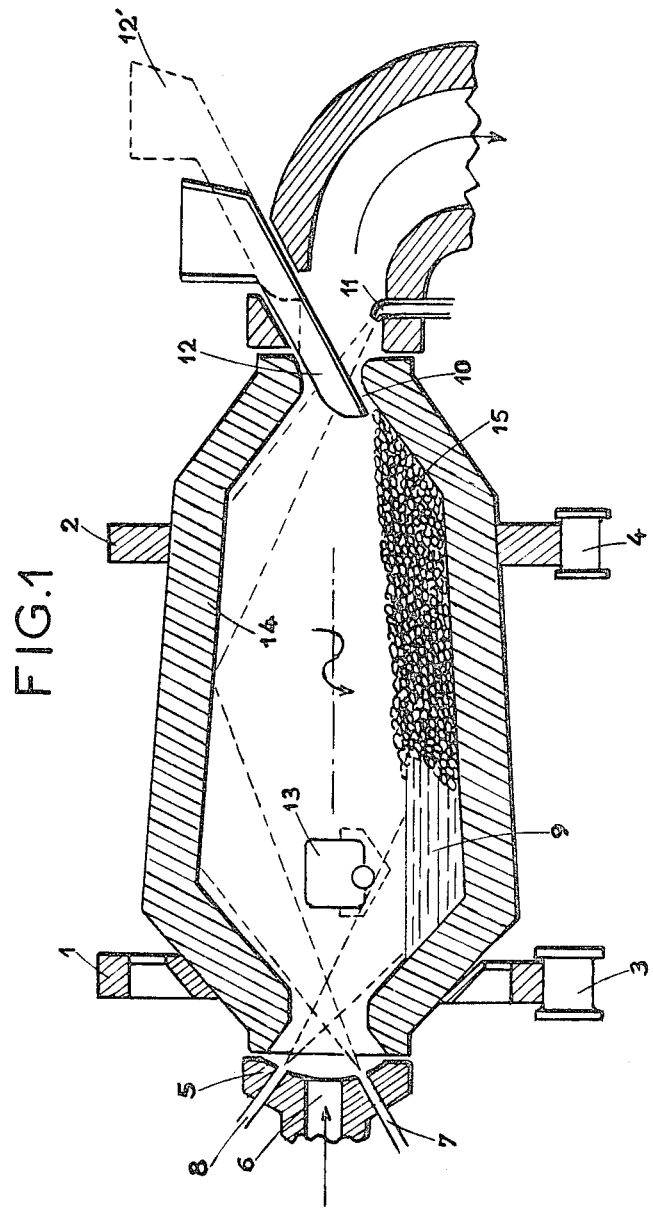
FIGURE 1 is a vertical section of a furnace according to the invention.

The furnace shown in FIGURE 1 has a horizontal axis and has rings 1 and 2 running on runners 3 and 4. The furnace has a burner housing 5 at one of its ends through which the heating flame enters. The said flame is fed by fuel obtained from a conduit 6, industrial oxygen pipes 7 and 8 being provided, one of these pointing towards the dome of the furnace and the other towards the bath.

During heating, the pipe 7 is fed and deflects the flame towards the top of the furnace so as to keep a reducing zone in contact with the bath 9.

During the refining operation, the pipe 8 is fed with industrial oxygen, the latter then being directed towards the surface of the bath.

The smoke is removed from the other end 10 of the furnace and industrial oxygen may be blown into it through a nozzle 11. The charge is introduced by a chute 12 at the same end 10; and the said chute can be withdrawn periodically into a position 12 so as to leave the opening 10 clear.

The furnace also has a tapping opening 13.

The internal casing 14 of the furnace is in the general form of a truncated cone, the smaller end of which is on the side of the aperture 10 for the removal of the smoke.

The furnace that has just been described is fed continuously or partly continuously by the chute 12, the reduction of the solid charge 15 beginning in a zone at a distance from the flame in which the temperature is kept at about 1150° C. because of the arrival of the charge. As reduction proceeds, the charge moves forward towards the part of the furnace in which the flame is situated; the metallic iron that appears melts and accumulates in the lowest part of the furnace, which is at the same time the hottest, as the temperature may be as high as 1600° or 1650° C. Blowing oxygen through the pipe 8 provides, if desired, for the refining of the melt by burning the carbon monoxide above the bath 9. The heat that is liberated is transmitted to the casing 14, and via the latter to the bath 9, as a result of the rotation of the furnace. When it is considered that the refining is sufficient tapping is effected.

FIGURES 2 and 3 show a modification according to which the furnace has two chambers 16 and 17.

The said two chambers are formed by the internal casing of the furnace and make it easy to repair the melt bath separately from the steel bath, and also make it easier to ensure the exactness of the composition of the steel at the moment of tapping. The temperatures are controlled in the furnace by adjusting the burner 18 and the oxygen jets 19 and 20 disposed as shown in FIGURE 1.

This division of the furnace into two parts enables the temperature of the smoke, which advances in countercurrent with respect to the charge, to be used better.

A gaseous, liquid or pulverulent fuel can be used for heating.

The chamber 16 has a temperature gradient from 1000 to 1100° C. on the side on which the charge is fed by the chute 21, and from 1250 to 1350° C. on the opposite side.

As in FIGURE 1, the chute 21 can be withdrawn and occupy the position 21′.

The chamber 16 is in the form of a truncated cone, the smaller end of which is on the side on which the charge arrives. A jet of industrial oxygen coming from a nozzle 23 enters through its aperture 22.

In the chamber 16, the charge, which is at first in the solid state at 24, moves forward towards the burner and the liquid melt accumulates at 25 in the lowest part. The narrowing 26 separating the two chambers 16 and 17 stops the liquid melt, which does not pass the said narrowing until its level has reached a sufficient height. The liquid melt then passes into the chamber 17 in which the proximity of the burner causes the temperature to be higher.

The oxygen jet coming from the conduit 20 enables the melt to be converted into steel in, say, about 10 minutes, while the oxygen jet from the conduit 19 burns the carbon monoxide resulting from the conversion. Benefit is derived in the chamber 17, therefore, from the calories coming from the burner and those that are due to the combustion of the carbon monoxide produced by the conversion of the melt into steel.

The combustion of the gases is completed in the chamber 16 and the smoke cools progressively as it approaches the aperture 22.

The chute 21 can be cooled by water circulation and discharging the charge either continuously or at close intervals. The latter solution is preferable in order not to interfere permanently with the oxygen jet coming from the nozzle 23.

The temperature rises progressively from that of the charge to about 1300° C. in the chamber 16. The charge introduced rapidly reaches a temperature of 1000°, and reduction begins and continues as the charge moves forward towards the burner. When the solid charge is about halfway along the chamber 16 in which the temperature is higher than 1150° C., the liquefaction of the carburised metal begins and the said metal accumulates in the low part.

The furnace has two doors 27 and 28 for slagging-off, taking metal samples, removing slag and, through the door 28, for tapping the metal at regular intervals.

The wall of the narrowing 26 can be cooled by water circulation in an annular zone 29, the water coming from a conduit 30 and flowing into a receiving spout 31.

The furnace that has just been described may have refractories of different characteristics for the two chambers 16 and 17. The said two chambers may likewise be repaired separately, as the chamber 17 is hotter and wears out more quickly than the chamber 16.

The invention is not, of course, limited by the details of the embodiments that have just been described, and the latter can be modified without departing from the scope of the invention.

In FIGURE 2, for example, the furnace may be rotated by any device, for example by a gear wheel engaging with a toothed ring 32.

Furthermore, the part enclosing the burner 18 and the oxygen jets 19 and 20 can be combined with a seal with the chamber 17, the said seal being cooled by a water circulation system 33.

What is claimed is:

1. Furnace rotating about a horizontal axis comprising at one end a burner producing a heating flame, an orifice at the other extremity for discharge of gases, a chute for feeding the oxide to be reduced located at said other extremity for discharge of gases, an internal casing providing a chamber, said chamber having the general form of a truncated cone coaxial with the furnace, the smaller end of said chamber being adjacent said chute, two jets of pure industrial oxygen discharging into the furnace adjacent said burner, one of said jets being obliquely directed toward the top of the furnace and being located under said burner to direct the burner gases toward the upper part of the furnace, the second of said jets being directed toward the surface of the bath in the furnace to purify the bath, a third jet of pure industrial oxygen discharging into the furnace and located adjacent said other extremity for discharge of gases and directed toward the interior and toward the top of the furnace to burn the carbon monoxide before escape from the furnace, and a tapping opening located at the large end of said truncated conical chamber.

2. Rotary furnace as claimed in claim 1, characterised in that the charging chute is disposed removably.

3. Rotary furnace as claimed in claim 1, characterised in that the furnace has an internal casing providing a chamber in the general form of a truncated cone, the smaller end of which is in the immediate proximity of the charging chute, and, on the side of the flame, a supplementary chamber, the two chambers being separated from one another by a narrowing of the cross-section of the furnace.

4. Rotary furnace as claimed in claim 1, characterised in that the wall of the narrowing of the cross-section of the furnace has cooling elements.

References Cited

UNITED STATES PATENTS

| 858,949 | 7/1907 | Bulmer | 266—18 |
| 942,509 | 12/1909 | Morgan | 263—33 |
| 2,091,850 | 8/1937 | Göhre | 266—20 XR |
| 2,238,815 | 4/1941 | Lohse | 266—36 |
| 2,750,277 | 6/1956 | Marshall | 266—33 XR |
| 2,878,004 | 3/1959 | Saeman | 263—32 |
| 3,074,705 | 1/1963 | Dano et al. | 263—33 |
| 3,206,182 | 9/1965 | Ankersen | 266—33 |

FOREIGN PATENTS

| 900,748 | 10/1944 | France. |
| 990,152 | 6/1951 | France. |
| 1,036,216 | 4/1953 | France. |

J. SPENCER OVERHOLSER, *Primary Examiner.*

R. SPENCER ANNEAR, *Assistant Examiner.*

U.S. Cl. X.R.

75—29; 263—33; 266—33